United States Patent
Lin et al.

(10) Patent No.: US 11,341,971 B2
(45) Date of Patent: May 24, 2022

(54) DISPLAY CONTENT CONTROL METHOD, COMPUTING DEVICE, AND NON-TRANSITORY STORAGE MEDIUM

(71) Applicant: HON HAI PRECISION INDUSTRY CO., LTD., New Taipei (TW)

(72) Inventors: Jung-Yi Lin, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 116 days.

(21) Appl. No.: 16/919,411

(22) Filed: Jul. 2, 2020

(65) Prior Publication Data

US 2021/0134287 A1    May 6, 2021

(30) Foreign Application Priority Data

Nov. 1, 2019   (CN) .......................... 201911061077.9

(51) Int. Cl.
  *G10L 15/22* (2006.01)
  *G10L 15/08* (2006.01)
  *G10L 15/30* (2013.01)
  *G06F 3/16* (2006.01)

(52) U.S. Cl.
  CPC .............. *G10L 15/22* (2013.01); *G06F 3/167* (2013.01); *G10L 15/08* (2013.01); *G10L 15/30* (2013.01); *G10L 2015/088* (2013.01); *G10L 2015/223* (2013.01)

(58) Field of Classification Search
  USPC ......................... 704/246, 247, 251, 252, 275
  See application file for complete search history.

(56) References Cited

U.S. PATENT DOCUMENTS

| | | | |
|---|---|---|---|
| 2018/0260680 A1* | 9/2018 | Finkelstein | G10L 15/22 |
| 2018/0285065 A1* | 10/2018 | Jeong | G06F 1/3265 |
| 2020/0126551 A1* | 4/2020 | Xiong | G06N 20/00 |
| 2021/0056969 A1* | 2/2021 | Yun | H04N 21/42222 |

FOREIGN PATENT DOCUMENTS

| | | |
|---|---|---|
| CN | 102595281 A | 7/2012 |
| CN | 203338751 U | 12/2013 |
| CN | 103676826 B | 9/2016 |
| CN | 205582479 U | 9/2016 |
| CN | 104972931 B | 11/2018 |
| CN | 106740901 B | 3/2019 |
| TW | M419929 U1 | 1/2012 |
| TW | 201329784 A1 | 7/2013 |
| TW | M478637 U | 5/2014 |

* cited by examiner

*Primary Examiner* — Leonard Saint Cyr
(74) *Attorney, Agent, or Firm* — ScienBiziP, P.C.

(57) ABSTRACT

A computing device includes a processor and a memory. The processor is configured to acquire a voice instruction through at least two voice receiving devices, analyze the voice instruction to determine at least one display device controlled by the voice instruction, generate a control instruction according to the voice instruction, and send the control instruction to the at least one display device to cause the at least one display device to display corresponding contents according to the voice instruction.

17 Claims, 3 Drawing Sheets

DISPLAY CONTENT CONTROL METHOD, COMPUTING DEVICE, AND NON-TRANSITORY STORAGE MEDIUM

FIELD

The subject matter herein generally relates to display content control methods, and more particularly to a display content control method implemented by a computing device.

BACKGROUND

When multiple display devices exist in a same place, if the display content in one of the display devices needs to be changed, a user generally needs to manually controls the display device. However, the manual control mode may result in poor user experience.

BRIEF DESCRIPTION OF THE DRAWINGS

Implementations of the present disclosure will now be described, by way of embodiments, with reference to the attached figures.

DETAILED DESCRIPTION

Figure 1:
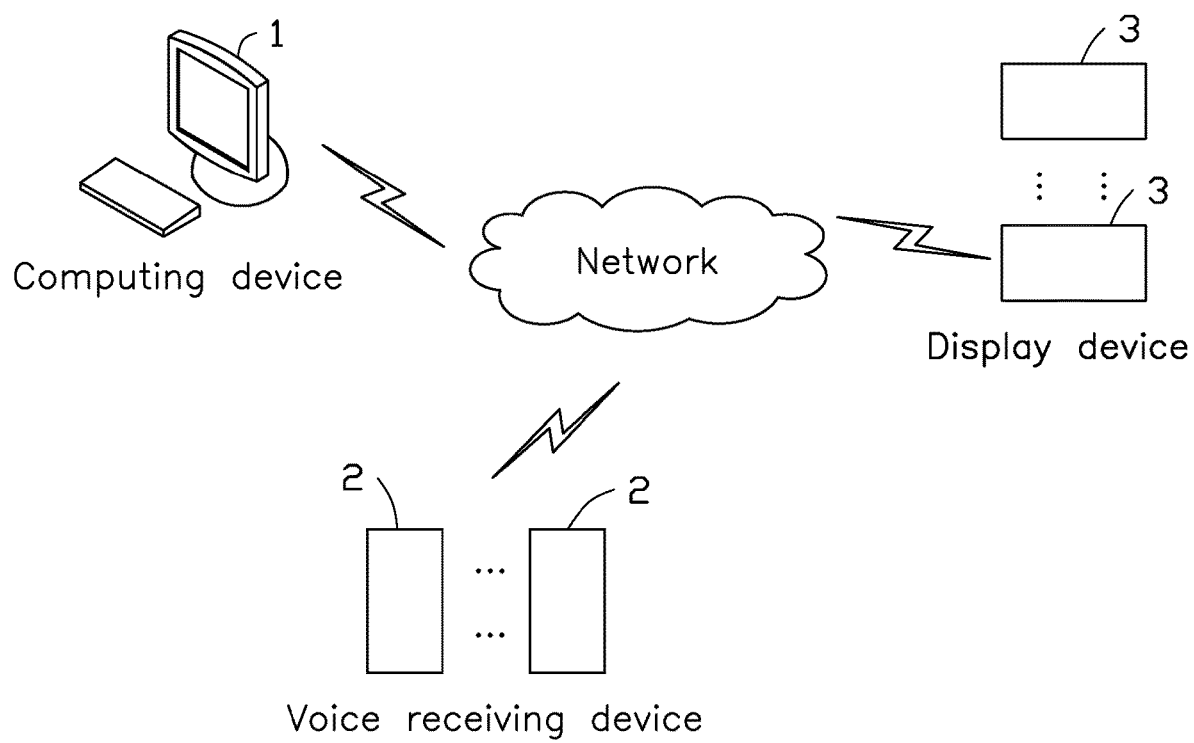
FIG. 1 is a schematic diagram of an embodiment of an application environment of a display content control method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a schematic diagram of an embodiment of an application environment of a display content control method.

The display content control method is applied to a computing device 1. The computing device 1, at least two voice receiving devices 2, and at least one display device 3 establish a communication connection through a network. The network may be a wired network or a wireless network, such as radio, wireless fidelity (WIFI), cellular, satellite, and broadcast.

The computing device 1 may be an electronic device, such as a personal computer, a server, and the like, on which content control software is installed. The server may be a single server, a server cluster, or a cloud server.

The voice receiving device 2 may be a wired microphone or a wireless microphone having a voice receiving function.

The at least one display device 3 may be a television, a notebook computer, a tablet computer, and the like having a display with a video playback function.

In other embodiments, the computing device 1 and the at least two voice receiving devices can be integrated in a single device.

Figure 2:
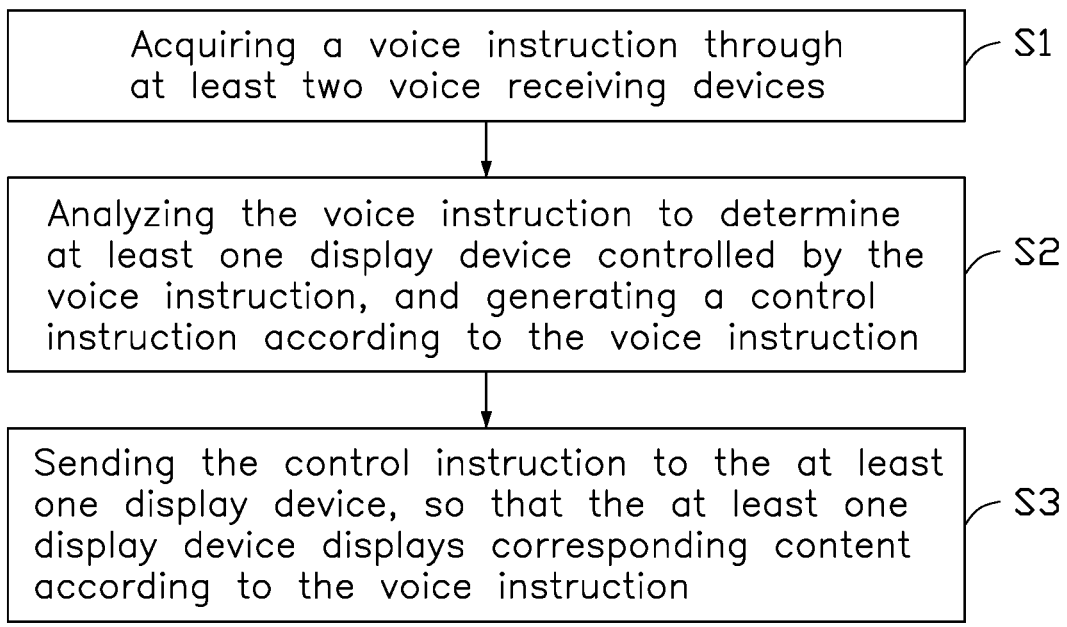
FIG. 2 is a flowchart of the display content control method.

FIG. 2 is a flowchart of the display content control method. According to different requirements, the order of blocks in the flowchart can be changed, and some blocks can be omitted.

At block S1, a voice instruction is acquired through at least two voice receiving devices.

In an embodiment, the at least two voice receiving devices are located in a preset area. The preset area includes, but is not limited to, a car compartment, a train compartment, an aircraft compartment, a waiting room, a conference room, and a monitoring room containing multiple display devices. There is a certain distance between the at least two voice receiving devices.

For example, a voice receiving device is provided on each side of the back of a five-seater car to receive voice instructions from passengers.

At block S2, the voice instruction is analyzed to determine at least one display device controlled by the voice instruction, and a control instruction according to the voice instruction is generated.

In one embodiment, the step of analyzing the voice instruction and determining at least one display device controlled by the voice instruction may include:

Extracting keywords contained in the voice instruction using a voice recognition method;

Determining whether the keyword includes display device information;

If the keyword includes display device information, searching for at least one display device corresponding to the display device information; and If the keyword does not include display device information, determining an utterance position of the sound instruction according to the locations of the at least two speech receiving units that received the sound instruction to determine a corresponding display device.

In an embodiment, based on the keywords extracted from the voice instruction, it is determined whether the voice instruction contains information about the display device, such as position information of the display device, a quantity of the display devices, and content information that needs to be adjusted. If the voice instruction contains information about the display device, at least one corresponding display device is determined according to the display device information. If the voice instruction does not contain information about the display device, the voice instruction received by multiple voice receiving devices is analyzed to determine the utterance position of the voice instruction and the location of the corresponding display device. There is a one-to-one correspondence between the utterance position of the voice instruction and the display device.

The step of determining the utterance position of the voice instruction and the display device corresponding to the utterance position may include:

Reading at least two voice script files received by the at least two voice receiving devices;

Determining the utterance position of the voice instruction according to the at least two voice script files according to a sound localization method; and Searching for the display device in a preset database corresponding to the utterance position.

The sound localization method may include at least one of positioning according to a sound intensity difference, positioning according to a time difference of the sound, positioning according to a tone color difference of the sound, and positioning according to a phase difference of the sound.

For example, the computing device 1 obtains the voice instruction acquired by the multiple voice receiving devices 2 and uses a voice recognition method to extract keywords in the voice instructions. For example, the voice instruction may be "please increase the volume". The voice receiving devices 2 send the voice instruction to the computing device 1, and the computing device 1 uses voice recognition technology to read text information in sound waves of the voice instruction. If the voice instruction does not contain information related to the display device, a positioning method based on the time difference of the sound will be used to locate the utterance position of the voice instruction, and the corresponding display device is determined in the preset database according to the utterance position of the voice instruction. The preset database stores a correspondence between the utterance position and the display device.

At block S3, the control instruction is sent to the at least one display device, so that the at least one display device displays corresponding content according to the voice instruction.

The step of sending the control instruction to the at least one display device so that the at least one display device displays corresponding content according to the voice instruction may include:

Judging whether the display contents of multiple display devices need to be controlled according to the voice instruction;

If the voice instruction is directed to only one display device, the display content of the display device is controlled according to the voice instruction;

If the voice instruction is directed to at least two display devices, the display content of the at least two display devices is controlled according to the voice instruction.

The steps may further include:

Analyzing whether the contents of the voice instructions of at least two display devices are the same;

If the contents of the voice instructions for the at least two display devices are the same, controlling the display contents of the at least two display devices simultaneously according to the voice instructions;

If the contents of the voice instructions for the two display devices are different, the display contents of the two display devices are controlled in turn according to a preset order.

In one embodiment, when the voice instruction includes information for switching the display content of different display devices, such as switching the content being displayed on a first display device to display on a second display device, the steps may include:

Receiving a voice instruction to switch the contents on the first display device to the second display device;

Recording playback information of the first display device and sending the playback information to the second display device, wherein the playback information includes one or more of a playback time and display function settings of current playback content of the first display;

The second display device receives the playback information of the first display device, and continues to display the contents of the first display device on the second display device according to the playback information.

For example, the computing device 1 analyzes the voice instruction and determines that the voice instruction is directed to only one display device 3, and then determines the location of the display device 3 according to the method of step S2 and sends the voice instruction to the display device 3. If the voice instruction is "please decrease the volume", the computing device 1 sends the voice instruction to the display device 3, and the display device 3 reduces the volume by a preset value according to the voice instruction. The preset value may be a step value of volume adjustment.

In another example, the computing device 1 analyzes the voice instruction and determines that the voice instruction is directed to three display devices. If the voice instruction is "increase the display brightness of display device A, display device B, and display device C", and the voice instruction includes serial number information of the three display devices, the voice instruction is sent to the three display devices individually. After receiving the voice instruction, the three display devices increase the display brightness of the displayed content by a preset value.

In another example, the voice instruction is "switch the display contents of display device A to display device B". The computing device 1 sends the voice instruction to display device A and display device B. Display device A records playback information of display device A and sends the playback information to display device B, wherein the playback information includes one or more of a playback time and display function settings of current playback content of display device A. Display device B receives the playback information of display device A and continues to display the contents of display device A according to the playback information.

Figure 3:
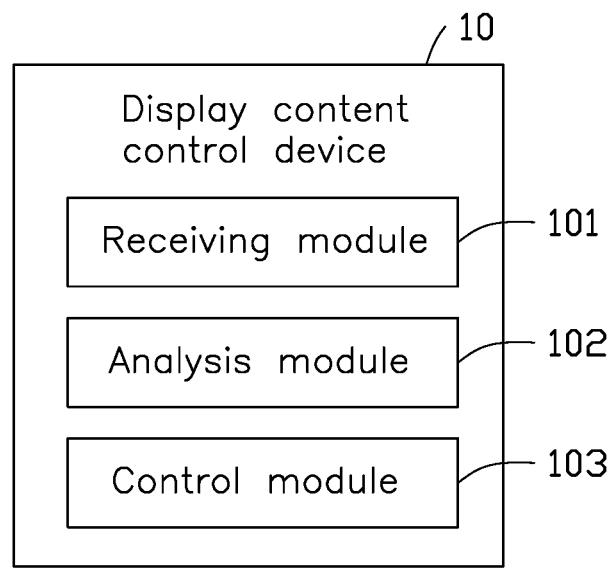
FIG. 3 is a function module diagram of an embodiment of a display content control device.

FIG. 3 is a function module diagram of an embodiment of a display content control device 10.

In one embodiment, the display content control device 10 is the computing device 1 of FIG. 1. The computing device is connected to a plurality of user terminals through a network. The display content control device 10 may include a plurality of function modules composed of program code segments. The program code segments may be stored in a memory of the computing device and executed by at least one processor to implement a display content control function.

In one embodiment, the display content control device 10 may include a plurality of function modules according to functions performed by the display content control device 10. The function modules may include a receiving module 101, an analysis module 102, and a control module 103.

The receiving module 101 is configured to acquire a voice instruction through at least two voice receiving devices. The functions of the receiving module 101 may correspond to the steps in block S1 in FIG. 2, and details will not be described further.

The analysis module 102 is configured to analyze the voice instruction to determine at least one display device controlled by the voice instruction, and generate a control instruction according to the voice instruction. The functions of the analysis module 102 may correspond to the steps in block S2 in FIG. 2, and details will not be described further.

The control module 103 is configured to send the control instruction to the at least one display device, so that the at least one display device displays corresponding content according to the voice instruction.

Figure 4:
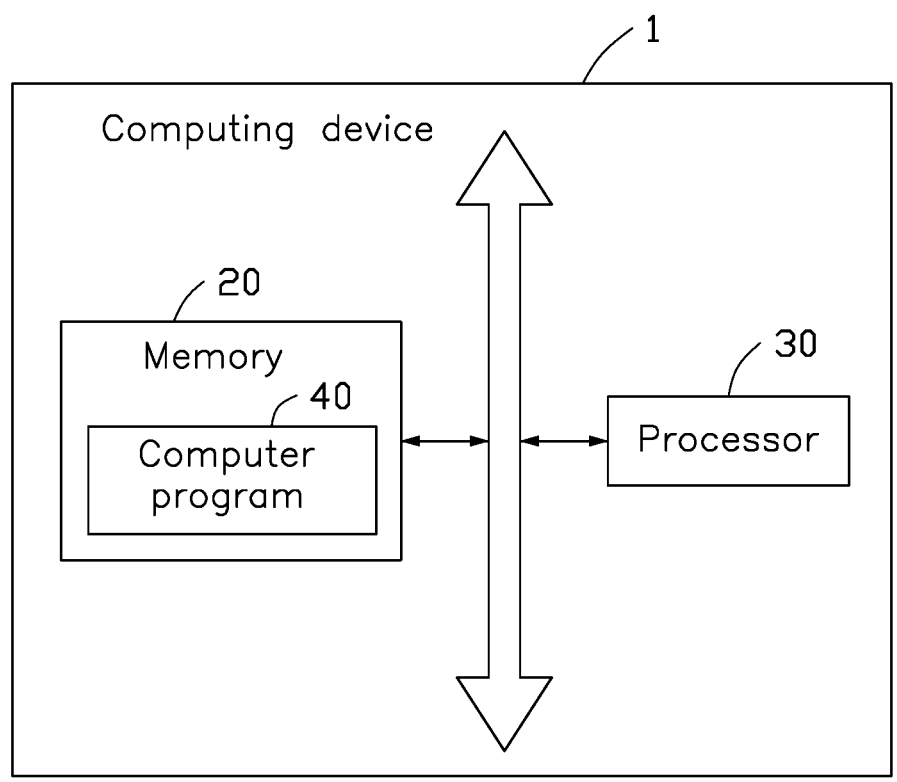
FIG. 4 is a schematic diagram of a computing device.

FIG. 4 is a schematic diagram of the computing device 1. The computing device 1 includes a memory 20, and a processor 30. The memory 20 stores a computer program 40, such as the display content control program, which is executable by the processor 30. When the processor 30 executes the computer program 40, the steps in the embodiment of the display content control method described above are implemented, for example, steps S1-S3 shown in FIG. 2. Alternatively, when the processor 30 executes the computer program 40, the functions of the modules in the embodiment of the display content control device described above are implemented, for example, the modules 101-103 in FIG. 3.

Exemplarily, the computer program 40 may be divided into one or more modules, and the one or more modules are stored in the memory 20 and executed by the processor 30. The one or more modules may be a series of computer program instruction segments capable of performing specific functions, and the instruction segments are used to describe the execution process of the computer program 40 in the computing device 1.

The computing device 1 may be a desktop computer, a notebook, a palmtop computer, or a cloud server. Those skilled in the art can understand that the schematic diagram is only an example of the computing device 1, and does not constitute a limitation on the computing device 1. It may include more or fewer components than shown in the figure, or combine some components, or have different components, for example, the computing device 1 may further include an input-output device, a network access device, a bus, and the like.

The processor 30 may be a central processing unit (CPU), or other general-purpose processor, digital signal processors (DSPs), application specific integrated circuits (ASICs), a field-programmable gate array (FPGA) or other programmable logic devices, discrete gate or transistor logic devices, discrete hardware components, etc. The general-purpose processor may be a microprocessor, or the processor 30 may be any conventional processor, etc. The processor 30 is a control center of the computing device 1 and connects various parts of the entire computing device 1 by using various interfaces and lines.

The memory 20 may be configured to store the computer program 40 and/or modules, and the processor 30 may execute or execute the computer program 40 and/or modules stored in the memory 20. The memory 20 may mainly include a storage program area and a storage data area, where the storage program area may store an operating system, application programs required for at least one function (such as a sound playback function, an image playback function, etc.), data (such as audio data, phonebook, etc.) created according to the use of the computing device 1. In addition, the memory 20 may include a high-speed random access memory, and may also include a non-volatile memory, such as a hard disk, an internal memory, a plug-in hard disk, a smart media card (SMC), a secure digital (SD) card, flash card, at least one disk storage device, flash memory device, or other volatile solid-state storage device.

When the modules integrated in the computing device 1 are implemented in the form of software functional units and sold or used as independent products, they can be stored in a computer-readable storage medium. Based on such an understanding, the present disclosure implements all or part of the processes in the method of the foregoing embodiment, and may also be completed by a computer program instructing related hardware. The computer program may be stored in a computer-readable storage medium. When the computer program is executed by a processor, the steps of the foregoing method embodiments can be implemented. The computer program includes computer program code, and the computer program code may be in a source code form, an object code form, an executable file, or some intermediate form. The computer-readable medium may include: any entity or device capable of carrying the computer program code, a recording medium, a U disk, a mobile hard disk, a magnetic disk, an optical disk, a computer memory, a read-only memory (ROM), a Random Access Memory (RAM), electric carrier signals, telecommunication signals, and software distribution media. It should be noted that the content contained in the computer-readable medium can be appropriately increased or decreased according to the requirements of legislation and patent practice in the jurisdictions. For example, in some jurisdictions, the computer-readable medium excludes electric carrier signals and telecommunication signals.

In the several embodiments provided by the present disclosure, it should be understood that the disclosed computing device and method can be implemented in other ways. For example, the embodiments of the computing device described above are merely schematic. For example, the division of the units is only a logical function division, and there may be another division manner in actual implementation.

In addition, each functional unit in each embodiment of the present disclosure may be integrated in the same processing unit, or each unit may exist separately physically, or two or more units may be integrated in the same unit. The integrated unit can be implemented in the form of hardware, or in the form of hardware plus software function modules.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A display content control method comprising:
acquiring, through at least two voice receiving devices, a voice instruction;
analyzing the voice instruction to determine at least one display device controlled by the voice instruction, and generating a control instruction according to the voice instruction; and sending the control instruction to the at least one display device, to cause the at least one display device to display corresponding contents according to the voice instruction;

wherein a method of analyzing the voice instruction and determining at least one display device controlled by the voice instruction comprises:

extracting keywords contained in the voice instruction using a voice recognition method;

determining whether the keyword comprises display device information;

if the keyword includes display device information, searching for at least one display device corresponding to the display device information; and if the keyword does not comprise display device information, determining an utterance position of the sound instruction according to the locations of the at least two speech receiving units that received the sound instruction to determine a corresponding display device.

2. The display content control method of claim 1, wherein a method of determining the utterance position of the voice instruction and the display device corresponding to the utterance position comprises:

reading at least two voice script files received by the at least two voice receiving devices;

determining the utterance position of the voice instruction according to the at least two voice script files according to a sound localization method; and searching for the display device in a preset database corresponding to the utterance position.

3. The display content control method of claim 2, wherein:

the sound localization method comprises at least one of positioning according to a sound intensity difference, positioning according to a time difference of the sound, positioning according to a tone color difference of the sound, and positioning according to a phase difference of the sound.

4. The display content control method of claim 1, wherein a method of sending the control instruction to the at least one display device so that the at least one display device displays corresponding content according to the voice instruction comprises:

determine whether the voice instruction comprises controlling instructions of the display contents of multiple display devices;

if the voice instruction is directed to only one display device, controlling the display contents of the display device according to the voice instruction; and if the voice instruction is directed to at least two display devices, controlling the display contents of the at least two display devices according to the voice instruction.

5. The display content control method of claim 4, wherein a method of sending the control instruction to the at least one display device so that the at least one display device displays corresponding content according to the voice instruction further comprises:

analyzing whether the contents of the voice instructions for the at least two display devices are the same;

if the contents of the voice instructions for the at least two display devices are the same, controlling the display contents of the at least two display devices simultaneously according to the voice instructions; and if the contents of the voice instructions for the two display devices are different, controlling the display contents of the at least two display devices in turn according to a preset order.

6. The display content control method of claim 5, wherein when the voice instruction is for switching the display contents of a first display device to display on a second display device, the step further comprises:

receiving a voice instruction to switch the contents on the first display device to the second display device;

recording playback information of the first display device and sending the playback information to the second display device, wherein the playback information comprises one or more of a playback time and display function settings of current playback contents of the first display; and receiving, by the second display device, the playback information of the first display device, and continuing to display the contents of the first display device on the second display device according to the playback information.

7. A computing device comprising:

a processor; and a memory storing a plurality of instructions, which when executed by the processor, cause the processor to:

acquire, through at least two voice receiving devices communicatively coupled to the computing device, a voice instruction;

analyze the voice instruction to determine at least one display device controlled by the voice instruction, and generate a control instruction according to the voice instruction; and send the control instruction to the at least one display device, to cause the at least one display device to display corresponding contents according to the voice instruction;

wherein the processor analyzes the voice instruction and determines at least one display device controlled by the voice instruction by:

extracting keywords contained in the voice instruction using a voice recognition method;

determining whether the keyword comprises display device information;

if the keyword includes display device information, searching for at least one display device corresponding to the display device information; and if the keyword does not comprise display device information, determining an utterance position of the sound instruction according to the locations of the at least two speech receiving units that received the sound instruction to determine a corresponding display device.

8. The computing device of claim 7, wherein the processor determines the utterance position of the voice instruction and the display device corresponding to the utterance position by:

reading at least two voice script files received by the at least two voice receiving devices;

determining the utterance position of the voice instruction according to the at least two voice script files according to a sound localization method; and searching for the display device in a preset database corresponding to the utterance position.

9. The computing device of claim 8, wherein:

the sound localization method comprises at least one of positioning according to a sound intensity difference, positioning according to a time difference of the sound, positioning according to a tone color difference of the sound, and positioning according to a phase difference of the sound.

10. The computing device of claim 7, wherein the processor sends the control instruction to the at least one display device so that the at least one display device displays corresponding contents according to the voice instruction by:
- judging whether the display contents of multiple display devices need to be controlled according to the voice instruction;
- if the voice instruction is directed to only one display device, controlling the display contents of the display device according to the voice instruction; and
- if the voice instruction is directed to at least two display devices, controlling the display contents of the at least two display devices according to the voice instruction.

11. The computing device of claim 10, wherein the processor sends the control instruction to the at least one display device so that the at least one display device displays corresponding content according to the voice instruction by:
- analyzing whether the contents of the voice instructions for the at least two display devices are the same;
- if the contents of the voice instructions for the at least two display devices are the same, controlling the display contents of the at least two display devices simultaneously according to the voice instructions; and
- if the contents of the voice instructions for the two display devices are different, controlling the display contents of the at least two display devices in turn according to a preset order.

12. The computing device of claim 11, wherein when the voice instruction is for switching the display contents of a first display device to display on a second display device, the processor is further configured to:
- receive a voice instruction to switch the contents on the first display device to the second display device;
- record playback information of the first display device and send the playback information to the second display device, wherein the playback information comprises one or more of a playback time and display function settings of current playback contents of the first display; and
- control the second display device to receive the playback information of the first display device and continue to display the contents of the first display device according to the playback information.

13. A non-transitory storage medium having stored thereon instructions that, when executed by at least one processor of a computing device, causes the at least one processor to execute instructions of a display content control method, the method comprising:
- acquiring, through at least two voice receiving devices, a voice instruction;
- analyzing the voice instruction to determine at least one display device controlled by the voice instruction, and generating a control instruction according to the voice instruction; and
- sending the control instruction to the at least one display device, to cause the at least one display device to display corresponding contents according to the voice instruction;
- wherein the step of analyzing the voice instruction and determining at least one display device controlled by the voice instruction comprises:
  - extracting keywords contained in the voice instruction using a voice recognition method;
  - determining whether the keyword comprises display device information;
  - if the keyword includes display device information, searching for at least one display device corresponding to the display device information; and
  - if the keyword does not comprise display device information, determining an utterance position of the sound instruction according to the locations of the at least two speech receiving units that received the sound instruction to determine a corresponding display device.

14. The non-transitory storage medium of claim 13, wherein step of determining the utterance position of the voice instruction and the display device corresponding to the utterance position comprises:
- reading at least two voice script files received by the at least two voice receiving devices;
- determining the utterance position of the voice instruction according to the at least two voice script files according to a sound localization method; and
- searching for the display device in a preset database corresponding to the utterance position.

15. The non-transitory storage medium of claim 14, wherein:
- the sound localization method comprises at least one of positioning according to a sound intensity difference, positioning according to a time difference of the sound, positioning according to a tone color difference of the sound, and positioning according to a phase difference of the sound.

16. The non-transitory storage medium of claim 13, wherein the step of sending the control instruction to the at least one display device so that the at least one display device displays corresponding content according to the voice instruction comprises:
- judging whether the display contents of multiple display devices need to be controlled according to the voice instruction;
- if the voice instruction is directed to only one display device, controlling the display contents of the display device according to the voice instruction; and
- if the voice instruction is directed to at least two display devices, controlling the display contents of the at least two display devices according to the voice instruction.

17. The non-transitory storage medium of claim 16, wherein the step of sending the control instruction to the at least one display device so that the at least one display device displays corresponding content according to the voice instruction further comprises:
- analyzing whether the contents of the voice instructions for the at least two display devices are the same;
- if the contents of the voice instructions for the at least two display devices are the same, controlling the display contents of the at least two display devices simultaneously according to the voice instructions; and
- if the contents of the voice instructions for the two display devices are different, controlling the display contents of the at least two display devices in turn according to a preset order.

* * * * *